Sept. 1, 1970  G. SEVER ET AL  3,526,263
VEHICLE TRACTION DEVICE
Filed May 15, 1968
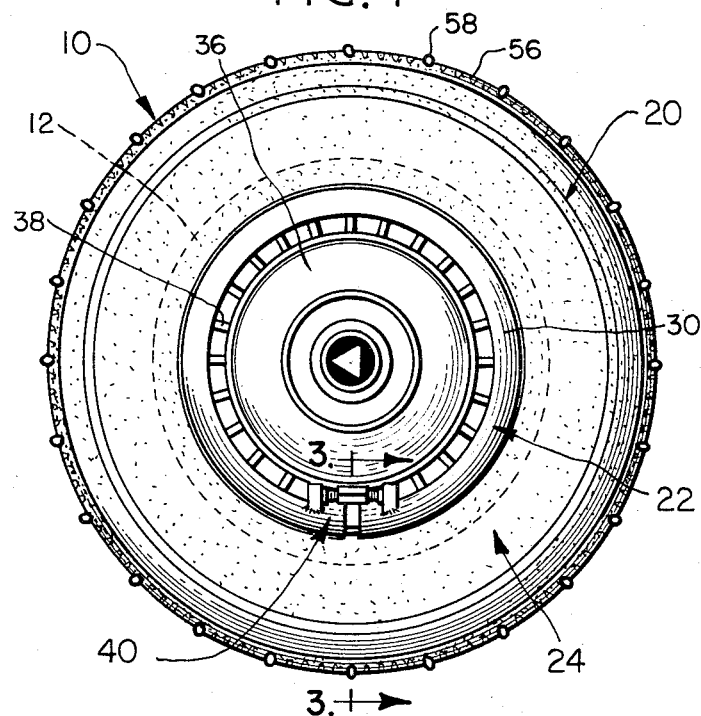
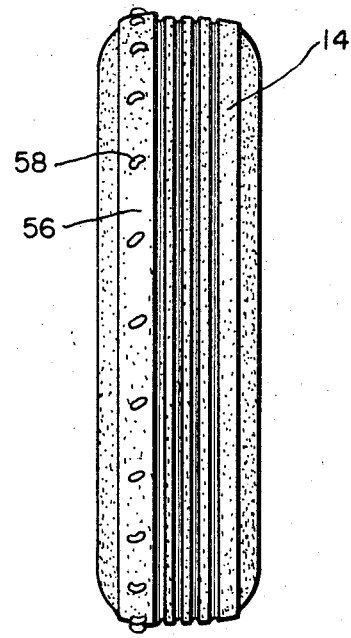
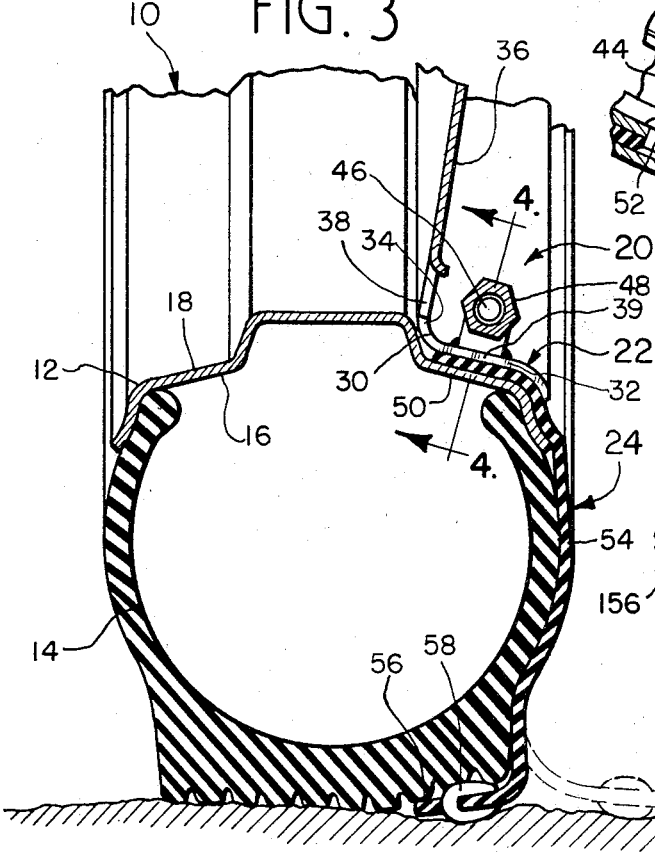
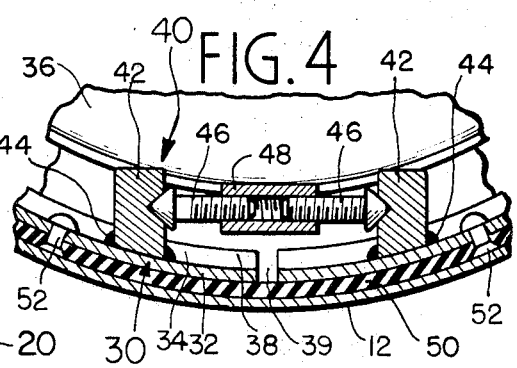
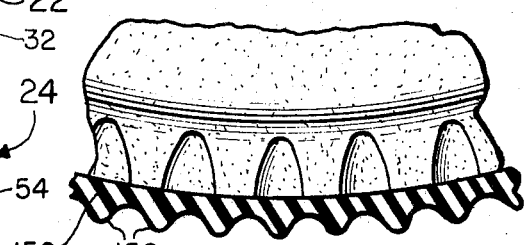
Inventors
George Sever
Frank C. Skupien
By Richard W. Carpenter
Attorney United States Patent Office 3,526,263
Patented Sept. 1, 1970

3,526,263
VEHICLE TRACTION DEVICE
George Sever, 4435 S. Kedvale, and Frank C. Skupien, 4852 S. Harding, both of Chicago, Ill. 60632
Filed May 15, 1968, Ser. No. 729,308
Int. Cl. B60c 27/02, 27/20, 27/10
U.S. Cl. 152—221                                    10 Claims

ABSTRACT OF THE DISCLOSURE

A device for increasing the traction of a vehicle such as an automobile or truck during its initial period of movement on slippery surfaces, comprising a mounting member adapted for removable attachment to the wheel and having secured thereto a flexible member adapted to cover a portion of the wheel tire tread when the wheel is turning slowly to provide increased traction for the wheel tire and adapted to come off of the wheel tire tread when the rotational movement of the wheel reaches a predetermined velocity.

---

This invention relates to traction devices and more particularly to a traction device adapted for easy attachment to an automobile wheel to aid in initially moving the car on slippery surfaces.

As is known to those familiar with the art, many types of traction devices and anti-slip devices have been produced through the years, but most of them present two common problems or defects. One problem presented by most of these devices is the difficulty of attaching them to automobile wheels. The other problem inherent in conventional devices is that they tend to wear out rapidly when they are on vehicles driven on bare road surfaces.

In many areas at many times of the year certain streets will be covered with ice or snow while nearby streets which are more heavily traveled will be almost if not completely bare and devoid of ice or snow. Obviously, it is not practical to attach and remove a traction device with great frequency. The most important function of a traction device for a vehicle is to aid the initial movement when the vehicle is parked on a slippery surface, rather than to serve as an antiskid device after the auto has once started to move at a normal speed.

It is therefore a primary object of this invention to provide a traction aid which may be readily attached to a vehicle wheel for affording additional traction during the initial movement of the vehicle, and which will not wear out rapidly when the vehicle is moving along a street or road devoid of ice or snow.

A more specific object of the invention is the provision, in a device of the type described, of a mounting member which is readily attachable to the wheel of a vehicle and which has secured thereto a flexible operating member adapted to partially cover the tire tread and provide increased traction when the wheel is turning slowly and to move out of the way as the speed of the wheel rotation increases.

These and other objects of the invention will be apparent from an examination of the following description and drawing, wherein:

FIG. 1 is a side elevation of a vehicle wheel and tire to which has been applied a traction device embodying features of the invention;

FIG. 2 is an end elevation of the structure illustrated in FIG. 1;

FIG. 3 is a vertical section taken on line 3—3 of FIG. 1;

FIG. 4 is a vertical section taken on line 4—4 of FIG. 3; and

FIG. 5 is a vertical section taken through the tire tread and traction device, but illustrating a modified form of the invention.

It will be understood that, for purposes of clarity, certain elements have been eliminated from certain views where they are believed to be illustrated to better advantage in other views.

Referring now to the drawing for a better understanding of the invention, and particularly to FIGS. 1 and 3, it will be seen that there is shown a vehicle wheel 10 which includes a rim portion 12 having a tire 14, mounted in the usual manner against the outer surface 16 of the rim, and having mounted against the inner surface 18 of the rim a traction device, indicated generally at 20, which embodies features of the invention.

As best seen in FIG. 3, traction device 20 includes a mounting member 22 adapted to be removably attached to vehicle wheel 10 and having secured thereto an operating member 24 adapted to partially cover the outer surface of tire 14 and provide increased traction for the wheel tire in a manner hereinafter described.

Mounting member 22 includes an annular element or ring 30 which is preferably L-shaped, as seen in cross section in FIG. 3, with an outer or circumferential portion 32 and in integrally formed inner or radial portion 34. In order to enhance the appearance of the device of the mounting member, it may be provided with a central decorative portion or hub 36 which is joined to ring 30 by a plurality of integral fingers or spokes 38.

As best seen in FIG. 4, ring 30 is split or interrupted, as at 39, to permit the ring to be expanded a slight amount sufficient to clamp it snugly against inside surface 18 of wheel rim 12 by means of a locking or clamping mechanism, indicated generally at 40, which is carried by the ring.

Clamping mechanism 40 includes a pair of spaced bradsets or lugs 42 rigidly secured, as by welds 44, to adjacent ends of ring 30 on opposite sides of split 39. Lugs 42 are adjustably interconnected for relative movement toward and away from each other by a pair of oppositely threaded bolts 46 which have remote ends non-rotatably secured to respective lugs 42 and which have adjacent ends received in oppositely threaded portions of a common nut 48, in the same manner as a turnbuckle arrangement, whereby rotation of the nut in one direction moves adjacent ends of the ring apart for clamping the device to the rim, and rotation of the nut in the opposite direction moves the ends of the ring toward each other to remove the ring from the rim.

Although the previously described method for attaching the mounting portion of the device to a vehicle wheel is preferred, other mounting arrangements may be employed without departing from the essential feature of the invention which resides in operating member 24.

Operating member 24 is somewhat similar in contour to one-half of a vehicle wheel tire and it includes an inner section 50 which is rigidly secured to the outer surface of ring circumferential portion 32, as by bonding or the use of rivets 52, so as to lie between ring 30 and inner surface 18 of wheel rim 12.

Extending radially outward from the outboard edge of inner section 50, so as to lie against the outboard side of tire 14, is an integral side section 54 having formed integrally with the radial outer edge thereof an outer section 56 which, as best seen in FIG. 3, is, when in its operative position disposed to extend axially inboardly from side section 54 so as to overlie the outboard portion of the tread or outer surface of tire 14.

It will be understood that operating member 24 of the device is flexible, being preferably formed of a molded material such as rubber or the like in much the same manner as a tire is formed. Because of its molded or normal contour, outer section 56 has a tendency to hug the adjacent outboard surface of the tread of tire 14 when wheel 10 is rotating slowly, and, conversely, when the wheel is rotating rapidly outer section 56 is urged by centrifugal force to bend or flex approximately 180 degrees outboardly to the position shown in phantom lines in FIG. 3.

Outher section 56 is preferably formed with a plurality of circumferentially spaced hard, sharp, metal cleats or ribs 58 embedded therein which afford a substantially greater amount of traction than would be provided by a convention tread on tire 14. This additional traction serves as an aid in the rotation of the wheel on a slippery surface such as a side street or driveway coated with ice or packed snow.

As the vehicle begins to move forward and its speed increases the centrifugal force of the wheel rotations cause outer section 56 to move off the tire tread and out of the way to the alternate or inoperative position where it will not rapidly wear out as the vehicle moves along a bare road surface at higher speeds. As the vehicle slows the outer section of the traction device will automatically move inboardly back into its operative or closed position over the tire tread so as to be in position to offer added traction when the vehicle starts up again.

In FIG. 5 a modified form of the invention is shown. This embodiment is exactly the same as the previously described embodiment in structure and operation except that outer section 156, instead of being provided with metal cleats is provided with enlarged integral ribs or cleats 158 formed of the same material as the operating member of the device. The ribs 158 operate in the same manner as cleats 58 to provide added traction for the wheel.

Thus, it will be understood that the invention provides a traction device that may be easily applied to a vehicle wheel for creating increased traction as the movement of the wheel is started and which moves out of the way as the speed of the vehicle increases so as not to wear out as rapidly as a device which is always in an operative position and always in engagement with the surface of the street.

What is claimed is:

1. A removable device for increasing the traction of a vehicle wheel tire, comprising:
    (a) a relatively rigid mounting member including fastening means for detachably securing said device to the inner surface of a vehicle wheel rim:
    (b) a relatively flexible operating member, including:
        (i) an inner section rigidly affixed to said mounting member and interposed between said mounting member and said wheel rim inner surface;
        (ii) a side section formed integrally with and extending radially outward from the outboard edge of said inner section and disposed to lie against the outboard side of said tire;
        (iii) an outer section formed integrally with and axially inboard from the outer edge of said side section, when in an operative position, so as to lie over a portion of the ground engaging surface of said tire and thereby provide increased traction when said wheel is initially rotated at a relatively low speed, and adapted to flex axially outboard from the outer edge of said side section, as a result of centrifugal force when in an inoperative position, so as not to lie over said tire ground engaging surface when said wheel is rotated at a relatively high speed.

2. A device according to claim 1, wherein said mounting member is formed of metal, and said operating member is formed of a flexible material such as rubber or the like.

3. A device according to claim 1, wherein said operating member is riveted to said mounting member.

4. A device according to claim 1, wherein said operating member is bonded to said mounting member.

5. A device according to claim 1, wherein said operating member outer section presents a plurality of circumferentially spaced, outwardly facing projections for providing increased traction.

6. A device according to claim 5, wherein said projections are formed of the same material as said outer section.

7. A device according to claim 5, wherein said projections are formed of a material which is substantially harder than the material of said outer section.

8. A device according to claim 1, wherein said outer section, when in its operative position, is disposed to cover less than one-half of the width of the ground engaging surface of said wheel tire.

9. A device according to claim 1, wherein said mounting member includes a split ring with adjacent ends having adjustable means for moving said ends away from each other to clamp said mounting member within a rim portion of said vehicle wheel and toward each other to release said mounting member from said wheel.

10. A device according to claim 9, wherein said clamping means includes a pair of fixed elements carried by the respective ring ends, and at least one movable element interconnecting said fixed elements.

References Cited

UNITED STATES PATENTS

| | | | |
|---|---|---|---|
| 2,453,273 | 10/1946 | Scott | 152—216 |
| 3,133,581 | 5/1964 | Jenks | 152—216 |
| 3,318,356 | 5/1967 | Vust | 152—216 |

ARTHUR L. LA POINT, Primary Examiner

C. B. LYON, Assistant Examiner

U.S. Cl. X.R.

152—217, 225